United States Patent
Wandler et al.

(10) Patent No.: US 6,226,700 B1
(45) Date of Patent: May 1, 2001

(54) COMPUTER SYSTEM WITH BRIDGE LOGIC THAT INCLUDES AN INTERNAL MODULAR EXPANSION BUS AND A COMMON MASTER INTERFACE FOR INTERNAL MASTER DEVICES

(75) Inventors: Shaun Wandler, Tomball; Jeffrey C. Stevens; Jeff W. Wolford, both of Spring; Robert Woods, Tomball, all of TX (US); Danny Higby, San Diego, CA (US); Russ Wunderlich, Turnwater, WA (US); Todd Deschepper, Spring; Jeffrey T. Wilson, Houston, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/042,173

(22) Filed: Mar. 13, 1998

(51) Int. Cl.[7] ............................. G06F 13/40; G06F 13/36
(52) U.S. Cl. ............................... 710/101; 710/110; 710/2
(58) Field of Search ................... 714/24, 44; 713/300; 710/22.15, 262, 108, 110, 101, 22, 2; 600/447

(56) References Cited

U.S. PATENT DOCUMENTS

| 5,533,204 | * | 7/1996 | Tipley | 710/108 |
| 5,634,073 | | 5/1997 | Collins et al. | 395/825 |
| 5,754,884 | * | 5/1998 | Swanstrom | 710/22 |
| 5,790,831 | * | 8/1998 | Lin et al. | 710/101 |
| 5,795,297 | * | 8/1998 | Daigle | 600/447 |
| 5,802,269 | * | 9/1998 | Poisner et al. | 714/44 |

OTHER PUBLICATIONS

VLSI Digital Signal Processors by Vijay K. Madisetti (Georgia Institute of Technology) Chapter 3, pp 61–63; Butterworth–Heinemann.

* cited by examiner

Primary Examiner—Daniel H. Pan
(74) Attorney, Agent, or Firm—Conley, Rose, Tayon, P.C.; Michael F. Heim; Jonathan M. Harris

(57) ABSTRACT

A computer system includes a CPU and a memory device coupled by a North bridge logic unit to an expansion bus, such as a PCI bus. A South bridge logic connects to the expansion bus and couples various secondary busses and peripheral devices to the expansion bus. The South bridge logic includes internal control devices or master devices that are designed to run master cycles on the expansion bus. The master devices couple to the expansion bus through a common expansion master interface, which executes master cycles on the expansion bus on behalf of the master devices. The South bridge also includes an internal modular master expansion bus coupling the internal master devices to the common master interface. The internal modular master expansion bus permits the master devices to run master cycles to any expansion bus by understanding a standardized group of signals represented by the internal modular master expansion (IMAX) bus. The master interface then is responsible for understanding the protocol of the expansion bus and converting the IMAX master bus signals to signals compatible with the expansion bus. In addition, a dedicated target IMAX bus may also be provided for coupling internal targets within the South bridge to masters on the expansion bus through a common expansion target interface.

36 Claims, 6 Drawing Sheets

COMPUTER SYSTEM WITH BRIDGE LOGIC THAT INCLUDES AN INTERNAL MODULAR EXPANSION BUS AND A COMMON MASTER INTERFACE FOR INTERNAL MASTER DEVICES

CROSS-REFERENCE TO RELATED APPLICATIONS

The following co-pending and commonly-assigned patent applications are generally related to the present application: (1) U.S. patent application Ser. No. 09/039,172, filed Mar. 13, 1998, entitled "Computer System Using An Improved Distributed DMA", (2) ) U.S. patent application Ser. No. 09/041,529, filed Mar. 13, 1998, entitled "Computer System With Bridge Logic That Asserts A System Management Interrupt Signal When an Address is Made to a Trapped Address and Which Also Completes the Cycle to the Target Address", (3) U.S. patent application Ser. No. 09/041,606, filed Mar. 13, 1998, entitled "Computer System With Bridge Logic That Includes An Internal Modular Expansion Bus and a Common Target Interface for Internal Target Devices", (4) U.S. patent application Ser. No. 09/042,327, filed Mar. 13, 1998, entitled "Computer System With Enhanced Docking Support", (5) U.S. patent application Ser. No. 09/042,038, filed Mar. 13, 1998, entitled "Computer System in an Expansion Base Using Optimized Delayed Transaction Arbitration Technique", (6) U.S. patent application Ser. No. 09/042,326, filed Mar. 13, 1998, entitled "Computer System With Improved Transition to Low Power Operation", (7) U.S. patent application Ser. No. 09/042,036, filed Mar. 13, 1998, entitled "Computer System With Bridge Logic That Permits Efficient Data Transfer Between a Processor, Memory Device and a Peripheral Device", (8) U.S. patent application Ser. No. 09/042,333, filed Mar. 13, 1998, entitled "Computer System With Improved Serial Bus Scheme"; and (9) U.S. patent application Ser. No. 09/042,277, filed Mar. 13, 1998, entitled "Smart Battery Power Management in a Computer System."

STATEMENT REGARDING FEDERALLY SPONSORED RESEARCH OR DEVELOPMENT

Not Applicable.

BACKGROUND OF THE INVENTION

1. Field of the Invention

The present invention relates generally to computer systems. More particularly, the present invention relates to circuitry that forms a communications "bridge" between components in a personal computer system. Still more particularly, the present invention relates to a bridge logic device that includes an internal modular expansion bus for facilitating the transfer of data between an internal master device and other computer system components operating under a different protocol.

2. Background of the Invention

A personal computer system includes a number of components with specialized functions that cooperatively interact to produce the many effects available in modern computer systems. The ability of these various components to exchange data and other signals is vital to the successful operation of a computer system. One of the critical requirements in designing a new computer system is that all system components (including those which may be added to the system by a user) must be compatible. A component is compatible if it effectively communicates and transfers data without interfering or contending with the operation of other system components. Because modern computer systems are designed with components that operate with different protocols, the likelihood that components may not properly communicate is heightened. Compatibility between devices with different protocols is achieved with bridge logic devices. As the name implies, bridge logic devices provide a communications bridge between components and busses operating under different protocols. The present invention is directed to an improved bridge logic device. Computer systems have components with different protocols because of the manner in which computers evolved, and the desire to make new computer designs backwards-compatible with prior designs. This backward compatibility insures that the user can use a peripheral device from a prior computer in a new computer system.

Early computer systems had relatively few components. As an example, some of the early computer systems included a processor (or CPU), random access memory (RAM), and certain peripheral devices such as a floppy drive, a keyboard and a display. These components typically were coupled together using a network of address, data and control lines, commonly referred to as a "bus." As computer technology evolved, it became common to connect additional peripheral devices to the computer through ports (such as a parallel port or a serial port), or by including the peripheral device on the main system circuit board (or "motherboard") and connecting it to the system bus.

The computer operates by having data flow through the system, with modification of the data occurring frequently. Typically, the CPU controls most of the activities of the computer system. The CPU supervises data flow and is responsible for most of the high-level data modification in the computer. The CPU, therefore, is the heart of the system and receives signals from the peripheral devices, reads and writes data to memory, processes data, and generates signals controlling the peripheral devices.

The performance of the computer system is determined only in part by the performance of the processor. Other factors also affect performance. One of the most critical factors is the bus that interconnects the various system components. The size and clock speed of the bus dictate the maximum amount of data that can be transmitted between components. One early bus that still is in use today is the ISA (Industry Standard Architecture) bus. The ISA bus, as the name implies, was a bus standard adopted by computer manufacturers to permit the manufacturers of peripheral devices to design devices that would be compatible with computer systems of most computer companies. The ISA bus includes 16 data lines and 24 address lines and operates at a clock speed of 8 MHz. A number of peripheral components have been developed over the years to operate with the ISA protocol.

Since the introduction of the ISA bus, computer technology has continued to evolve at a relatively rapid pace. New peripheral devices have been developed, and both processor speeds and the size of memory arrays have increased dramatically. In conjunction with these advances, designers have sought to increase the ability of the system bus to transfer more data at a faster speed. One way in which system bus has been made more effective is to permit data to be exchanged in a computer system without the assistance of the CPU. To implement this design, however, a new bus protocol had to be developed. One such bus that permits peripheral devices to run cycles independently of the CPU as a "master" device is the EISA (Extended Industry Standard Architecture) bus. The EISA bus enables various system components residing on the EISA bus to obtain mastership of the bus and to run cycles on the bus. Another bus that has become increasingly popular is the Peripheral Component Interconnect (PCI) bus. Like the EISA bus, the PCI bus has bus master capabilities. The PCI bus also operates at a clock speed of 33 MHz or faster.

Because of the bus mastering capabilities and other advantages of the PCI (and EISA) bus, many computer manufacturers now implement one or the other of these busses as the main system bus in the computer system. Because of the proliferation of devices that had been developed for the ISA bus, the computer manufacturers also continued to provide an ISA bus as part of the computer system to permit the use of the many peripheral devices that operated under that protocol. To further provide flexibility, some computer manufacturers provide all three busses in the same computer system to permit users to connect peripheral devices of all three protocols to the computer system. To implement these various busses in the same computer system, special bridge logic circuit has been developed to interface to the various busses.

FIG. 1 shows a representative prior art computer system that includes a CPU coupled to a bridge logic device via a CPU bus. The bridge logic device is sometimes referred to as a "North bridge" for no other reason than it often is depicted at the upper end of a computer system drawing. The North bridge also couples to the main memory array by a memory bus. The North bridge couples the CPU and memory to the peripheral devices in the system through a PCI bus or other expansion bus (such as an EISA bus). Various components that understand PCI protocol may reside on the PCI bus, such as a graphics controller.

If other expansion busses are provided in the computer system, another bridge logic device typically is used to couple the PCI bus to that expansion bus. This bridge logic is sometimes referred to as a "South bridge" reflecting its location vis-a-vis the North bridge in a typical computer system drawing. An example of such bridge logic is described in U.S. Pat. No. 5,634,073, assigned to Compaq Computer Corporation. In FIG. 1, the South bridge couples the PCI bus to an ISA bus. Various ISA-compatible devices are shown coupled to the ISA bus.

As one skilled in the art will understand, devices residing on the ISA bus may need to run cycles to memory via the PCI bus. The PCI bus permits devices residing on the PCI bus to run master cycles to targets residing on the PCI bus. To permit devices on other busses to run master cycles on the PCI bus, the controller for that device must be included in the South bridge logic. This controller then would be responsible for converting the signals from other busses to PCI signals for master cycles. Thus, the controller for the ISA device, for example, must understand the protocol of both busses. As an example, if the designer wanted to permit the modem to run master cycles on the PCI bus in FIG. 1, then an associated controller would be provided in the South bridge logic that was capable of asserting master signals on the PCI bus and translating ISA signals to PCI signals. If the modem also could be a target for PCI cycles, the controller in the South bridge also has to be capable of accepting PCI cycles and converting the PCI cycles to ISA cycles. Similarly, if the hard drive could also function as a PCI master, then an associated controller must also be provided in the South bridge logic to assert master signals on the PCI bus and receive and process PCI signals from other masters.

One of the problems with this technique is that when the destination bus for internal masters changes, all the internal masters must be redesigned. Further, the destination bus interface for internal masters requires numerous modifications when adding additional masters. Also, the internal masters are more complex than required to understand the expansion bus protocol. In addition, every time that another expansion device is added, the South bridge logic must be re-designed to include a PCI controller for that device. Similarly, every time that the expansion bus changes or is replaced with a different design, then the entire South bridge logic must be re-designed. Also, the South bridge must be designed in a manner to insure that two controllers within the South bridge do not both assert mastership signals at the same time causing bus contention problems. To date, no one has developed a bridge logic device that overcomes these deficiencies.

SUMMARY OF THE INVENTION

The present invention includes a bridge logic device that overcomes the problems described above by providing a common expansion bus master interface that functions as an interface for all controllers residing in the bridge logic. As a result, the controllers in the bridge logic do not need to understand the protocol of the expansion bus. The expansion bus master interface receives appropriate signals from each of the controllers that desire to run cycles on the expansion bus and converts those signals to conform to the protocol of the expansion bus. The expansion bus master controllers in the bridge logic couple to the internal master interface through a set of standardized address, data and control lines referred to herein as the IMAX (Internal Modular ASIC EXpansion) Master bus. By using a standardized Master bus within the bridge logic, peripheral devices can be designed to readily interface with the bridge logic. In addition, if the protocol of the expansion bus changes, or if the expansion bus itself changes, only the expansion bus master interface needs to be modified in the bridge logic. The use of the modular internal bus and design eliminates the necessity of changing all of the control devices within the bridge logic to conform to a change in the expansion bridge.

In the preferred embodiment, a South bridge logic device is disclosed that includes a common PCI master interface. The PCI master interface couples to each of the master control devices within the South bridge logic, such as the USB controller, the ISA/DMA controller, the IDE controller and other controllers. The PCI master interface preferably couples to these internal controllers via an internal modular master expansion bus. The PCI master interface receives address, data and control signals via the modular expansion bus, without the necessity of a multitude of sideband signals. The PCI master interface functions to translate signals from the internal modular bus to signals compatible with the PCI protocol, and then the PCI master interface executes master cycles on the PCI bus.

According to another aspect of the present invention, a South bridge logic device includes an internal modular expansion bus comprised of separate master and target busses. The master internal modular expansion bus preferably connects to a master interface for coupling the internal expansion bus to an external expansion bus. The expansion master interface functions as a common interface to the external expansion bus for all control devices in the South bridge that run master cycles to the external expansion bus. In the preferred embodiment, the external expansion bus is the PCI bus, but the expansion master interface could be readily adapted to operate with other expansion busses. In fact, one of the purposes of the present invention is to permit the South bridge to be easily modified to make it compatible with new bus technologies by simply modifying the devices that directly interface to the expansion bus, such as the expansion master interface.

According to the preferred embodiment, the South bridge includes an internal modular master expansion bus that couples to the expansion master interface. As a result, all cycle requests to the PCI bus (or other expansion bus) are routed through the expansion master interface in the South bridge. Preferably, the expansion master interface includes an arbiter to determine which of the control devices within the South bridge can run a master cycle via the internal modular master expansion bus to the expansion master interface. The expansion master interface then runs a cycle on the PCI bus (or other expansion bus) by asserting the appropriate signals to gain control of the PCI bus. In accordance with the preferred embodiment, the South bridge also includes the PCI arbiter for arbitrating mastership of the PCI bus among the various masters coupled to that bus.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

A better understanding of the present invention can be obtained when the following detailed description of the preferred embodiment is considered in conjunction with the following drawings, in which.

The following detailed description describes the preferred embodiment for implementing the underlying principles of the present invention. One skilled in the art should understand, however, that the following description is meant to be illustrative of the present invention, and should not be construed as limiting the principles discussed herein. In addition, certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF A PREFERRED EMBODIMENT

Figure 1:
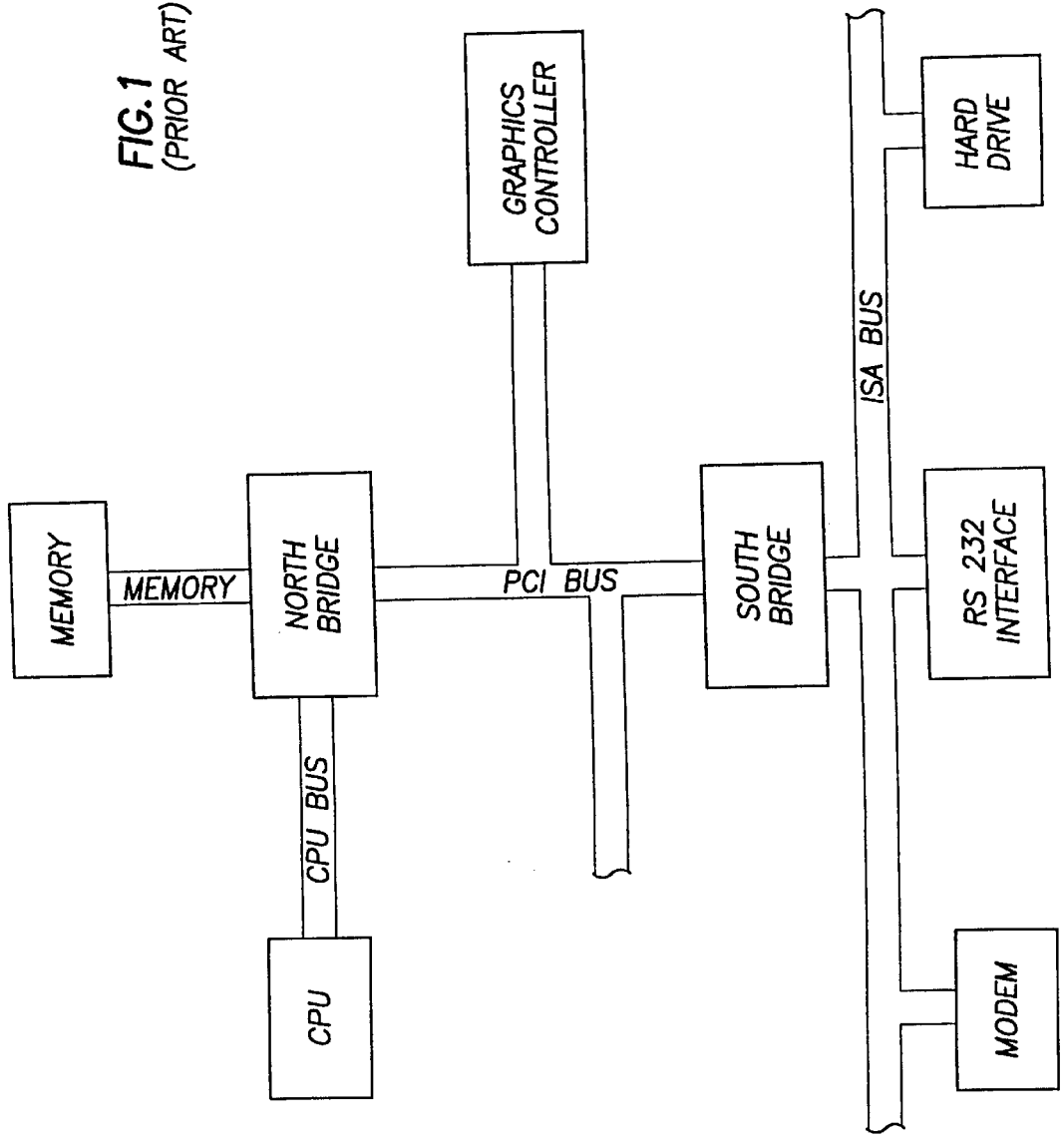
FIG. 1 is a block diagram of a prior art computer system implementing a bridge logic to couple together dissimilar busses.
Figure 2:
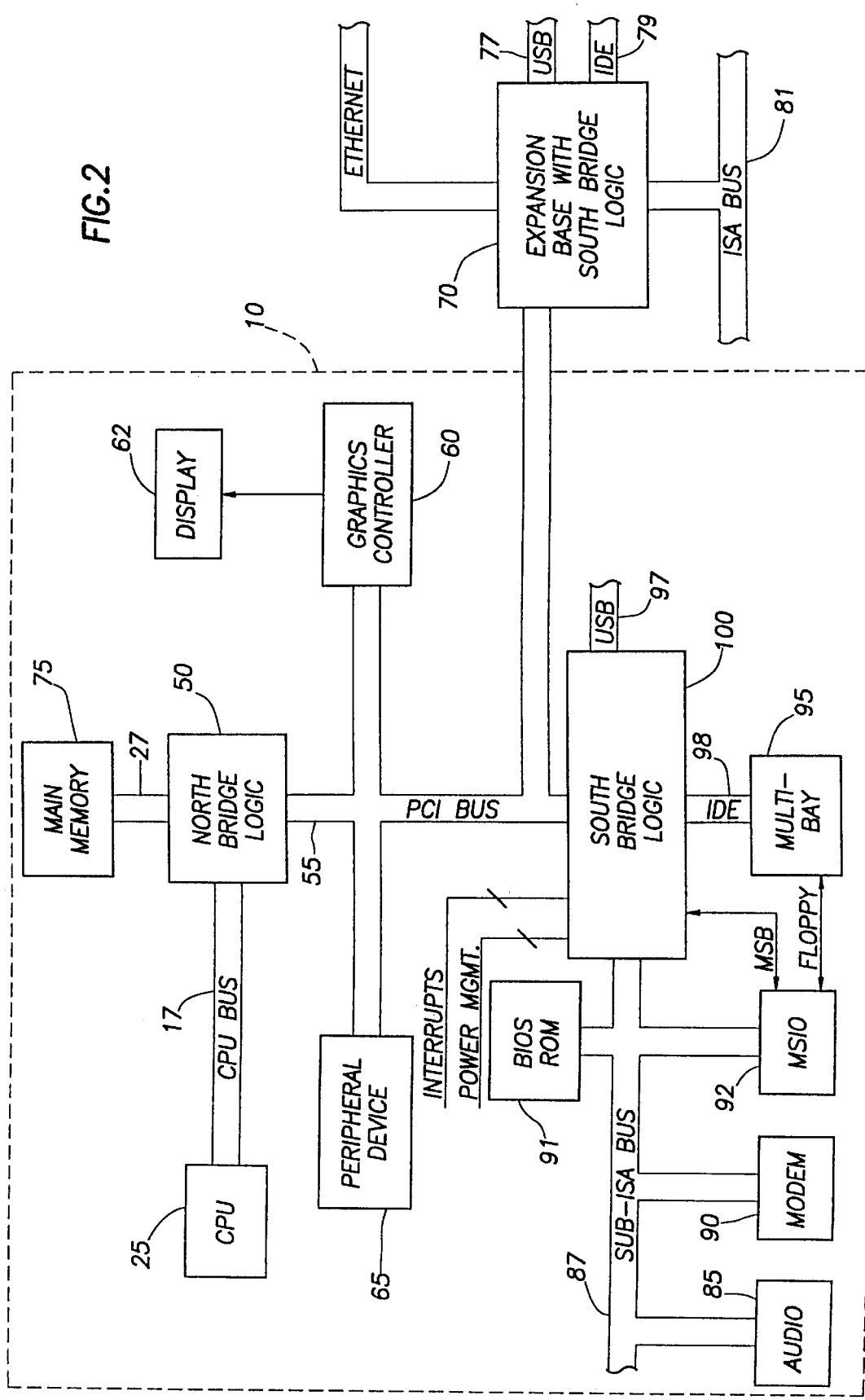
FIG. 2 is a block diagram of a portable computer system constructed in accordance with the preferred embodiment of the present invention with an improved bridge logic device.

Referring now to FIG. 2, a computer system 10 constructed in accordance with the preferred embodiment generally includes a processor or CPU 25 coupled to a main memory array 75 and a variety of other peripheral computer system components through an integrated bridge logic device 50. As depicted in FIG. 2, the bridge logic 50 sometimes is referred to as a "North bridge." The CPU preferably couples to bridge logic 50 via a CPU bus 17, or the bridge logic 50 may be integrated into the CPU 25. The CPU 25 may comprise, for example, a Pentium® II Microprocessor. It should be understood, however, that other alternative types of microprocessors could be employed. Further, an embodiment of computer system 10 may include multiple processors, with each processor coupled through the CPU bus 17 to the bridge logic unit 50.

The main memory array 75 preferably couples to the bridge logic unit 50 through a memory bus 27, and the bridge logic 50 preferably includes a memory control unit (not shown) that controls transactions to the main memory 75 by asserting the necessary control signals during memory accesses. The main memory 75 functions as the working memory for the CPU 25 and generally includes a conventional memory device or array of memory devices in which application programs and data are stored. The main memory array may comprise any suitable type of memory such as dynamic random access memory ("DRAM") or any of the various types of DRAM devices such as synchronous dynamic random access memory ("SDRAM") or extended data out dynamic random access memory (EDO DRAM).

The computer system 10 also preferably includes a graphics controller 60 that couples to the bridge logic 50 via an expansion bus 55 as shown in FIG. 2. Alternatively, the graphics controller 60 may couple to bridge logic 50 through an Advanced Graphics Port ("AGP") bus (not specifically shown). As one skilled in the art will understand, the graphics controller 60 controls the rendering of text and images on a display device 62. The graphics controller 60 may embody a typical graphics accelerator generally known in the art to render three-dimensional data structures on display 62. These data structures can be effectively shifted into and out of main memory 75 via the expansion bus and bridge logic 50. The graphics controller 60 therefore may be a master of the expansion bus (including either PCI or AGP bus) enabling the graphics controller 60 to request and receive access to a target interface within the bridge logic unit 50, including the memory control unit. This mastership capability permits the graphics controller 60 to access main memory 75 without the assistance of the CPU 25. A dedicated graphics bus accommodates rapid retrieval of data from main memory 75. As will be apparent to one skilled in the art, the bridge logic 50 includes a PCI interface to permit master cycles to be initiated and received by bridge logic 50. If an AGP bus is included in the system, the bridge logic 50 also includes an interface for initiating and receiving cycles to and from components on the AGP bus. The display 62 comprises any suitable electronic display device upon which an image or text can be represented. A suitable display device may include, for example, a cathode ray tube ("CRT"), a liquid crystal display ("LCD"), a thin film transistor ("TFT"), a virtual retinal display ("VRD"), or any other type of suitable display device for a computer system.

In the preferred embodiment, the expansion bus 55 comprises a Peripheral Component Interconnect (PCI) bus. The present invention, however, is not limited to any particular type of expansion bus, and thus various busses may be used including a high speed (100 MHz or faster) PCI bus. In the preferred embodiment, a plurality of PCI peripheral devices reside on the PCI bus 55. The PCI devices may include any of a variety of peripheral devices such as, for example, network interface cards (NIC's), video accelerators, audio cards, hard or floppy disk drives, PCMCIA drives, Small Computer Systems Interface ("SCSI") adapters and telephony cards. Although only one PCI peripheral device 65 is depicted in FIG. 2, it should be recognized that computer system 10 may include any number of PCI devices as desired.

The following discussion describes the preferred embodiment of computer system 10 for a laptop computer that can be connected to an expansion base 70 via the PCI bus 55. This should not be construed as limiting the present invention to a laptop. The present invention also may be used with a desktop system, work station, server, or handheld computer. In addition and as mentioned above, computer system 10 can be implemented with respect to the particular bus architectures shown in FIG. 2 (i.e., PCI bus), or other bus architectures, as desired. The embodiment described herein, however, assumes bus 55 represents a PCI bus, as shown in FIG. 2, and thus the following discussion will focus on configuring the present invention for that embodiment. Further, CPU 25 preferably comprises a Pentium® II processor and thus CPU bus 17 represents a Pentium II bus®. These bus protocols and the terminology used with respect to these protocols are well known to those of ordinary skill in the art. If a more thorough understanding of the PCI, or Pentium® II bus is desired, reference should be made to the *PCI Local Bus Specification* (1993), and *Intel P6 External Bus Specification*. If an AGP bus also is used in the computer system, reference may be made to the *Accelerated Graphics Port Interface Specification* (Intel, 1996).

Referring still to FIG. 2, another bridge logic device 100 also preferably connects to expansion bus 55. This bridge logic device 100 (which sometimes is referred to a "South bridge") couples or "bridges" the primary expansion bus 55 to other secondary expansion busses. These other secondary expansion busses may include an ISA (Industry Standard Architecture) bus, a sub-ISA bus, a USB (Universal Serial Bus), an IDE bus, an IEEE 1394 standard (or "fire wire") bus, or any of a variety of other busses that are available or may become available in the future. In the preferred embodiment of FIG. 2, the South bridge logic 100 couples to a sub-ISA bus 87, a USB bus 97 and an IDE bus 98. As will be apparent to one skilled in this art, various peripheral devices may be coupled to each of these busses. Thus, as shown in the preferred embodiment of FIG. 2, an MSIO (Mobile Super I/O) chip 92 connects to the sub-ISA bus, as does an audio card 85, modem 90 and BIOS ROM 91. Similarly, according to the preferred embodiment, a multi-bay configuration couples to the IDE bus 98 and to the MSIO 92. The multi-bay configuration preferably includes three independent bays connected in any master/slave, primary/secondary configuration supporting hot-plugging of IDE devices in the bays. As one skilled in the art will understand various IDE devices are available including CD ROM drives, floppy drives, tape drives, and the like. The USB 97 supports various peripherals, especially video peripherals such as video cameras for teleconferencing purposes. In addition to the busses discussed above, the South bridge also preferably connects to interrupt signal lines, power management signal lines, and a MSB (MSIO Serial Bus).

As noted above, the computer system 10 preferably comprises a laptop computer. To facilitate use of the computer system 10 within a traditional desktop environment, an expansion base preferably is available for connecting the laptop computer system to additional peripheral devices and to a computer network via an Ethernet bus. The expansion base may include any type of configuration, including a port replicator or docking station. The present invention envisions, however, that the expansion base also includes a South bridge logic (not shown specifically) for coupling components on the PCI bus to other components coupled to the expansion base. Thus, as shown in FIG. 2, a South bridge logic device within the expansion base 70 couples the PCI bus to various expansion busses including an ISA bus 81, USB 77 and IDE bus 79. The following discussion focuses on the architecture of the South bridge logic 100. This same architecture may be used (with some minor modifications), if desired, for the South bridge logic within the expansion base 70. Alternatively, the present invention also may be implemented by using a prior art South bridge device in the expansion base 70.

Figure 3:
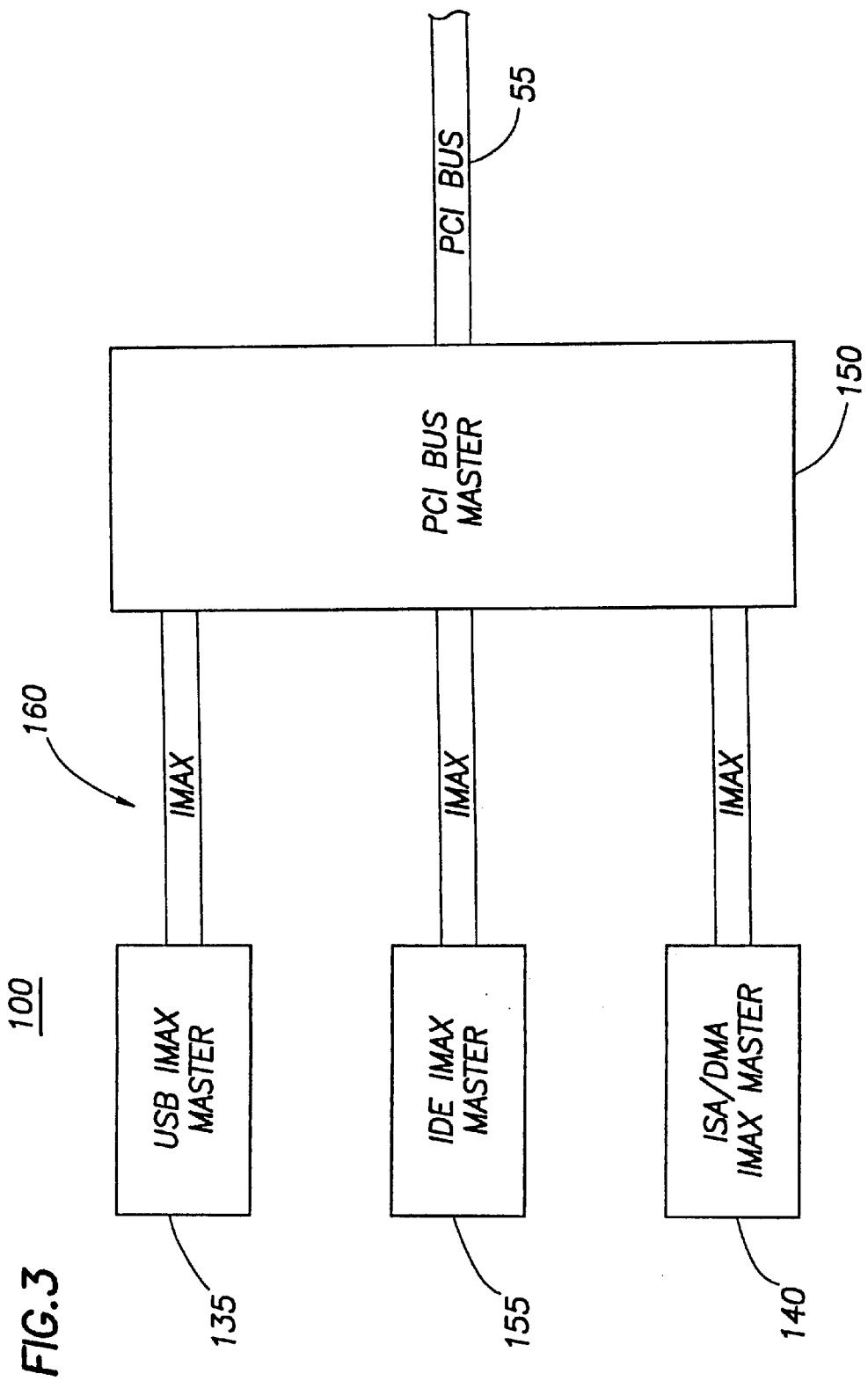
FIG. 3 is a block diagram of the improved bridge logic device of FIG. 2 that illustrates a common bus master interface.

Referring now to FIG. 3, the South bridge 100 of the present invention is depicted conceptually to illustrate certain aspects of the present invention. The South bridge shown in FIG. 3 preferably includes a PCI bus master interface 150 that couples South bridge devices capable of running master cycles to the PCI bus 55, and an IMAX (Internal Modular ASIC EXpansion) master bus 160 coupling the PCI bus master interface 150 to various internal master devices 135, 140, 155. Although FIG. 3 shows the South bridge 100 connecting to a PCI bus, it should be understood that expansion bus 55 may comprise any type of system bus capable of use in a computer system. Thus, for example, expansion bus 55 may comprise an IEEE standard 1394 (fire wire) bus, or any other suitable bus. Similarly, while bus master interface device 150 is shown as a PCI master, master interface 150 may be modified for use with other bus standards. The only requirement is that master interface must be capable of running master cycles on the expansion bus.

The internal master devices comprise control interfaces within the South bridge associated with components and/or busses external to the South bridge 100. Three such control interfaces are shown conceptually in FIG. 3, including a USB master 135, an IDE master 155, and a ISA/DMA master 140. Each of these masters are referred to in FIG. 3 as "IMAX masters" denoting the fact that each of these control interfaces are capable of obtaining mastership of the IMAX master bus 160, and with the assistance of the expansion bus master 150, running master cycles on the PCI bus 55. The USB master 135, therefore, interfaces to the USB and initiates master cycles on the IMAX master bus 160. The IDE IMAX master 155 interfaces to the IDE bus and initiates master cycles on the IMAX master bus 160. The ISA/DMA IMAX master 140 initiates master cycles on the IMAX master bus as part of DMA cycles occurring on the ISA bus.

The IMAX master bus 160 couples the various internal controllers to the PCI master interface 150. Thus, the IMAX master bus 160 preferably includes data, address and control lines for transmitting the necessary information to the PCI bus master 150 to enable that device to execute PCI master cycles.

As the following discussion will describe in more detail, the expansion bus master interface 150 couples internal master devices within the South Bridge 100 to external targets on the expansion bus 55. The implementation of a common expansion bus master 150 and internal modular master bus makes it unnecessary for the internal master devices 135, 140, 155 to understand PCI protocol (or whatever the protocol is of the expansion bus). The internal masters 135, 140, 155 must only be capable of implementing a single protocol, the IMAX protocol. In contrast to prior systems in which each of the internal control devices in the bridge logic were required to understand PCI protocol, the expansion bus master interface 150 of the present invention performs the necessary translations from the IMAX protocol to the PCI protocol. Thus, in the preferred embodiment, an IDE master 155 (for example) indicates a desire to run a cycle to memory by sending appropriate IMAX address, data and control signals to the PCI Master interface 150, which in turn converts those signals to PCI signals that can be transmitted on the PCI bus 55 to the memory controller in the North bridge logic. As a result, the internal IMAX master devices need not be capable of understanding and running PCI cycles since the expansion bus master interface 150 performs that function.

Figure 4:
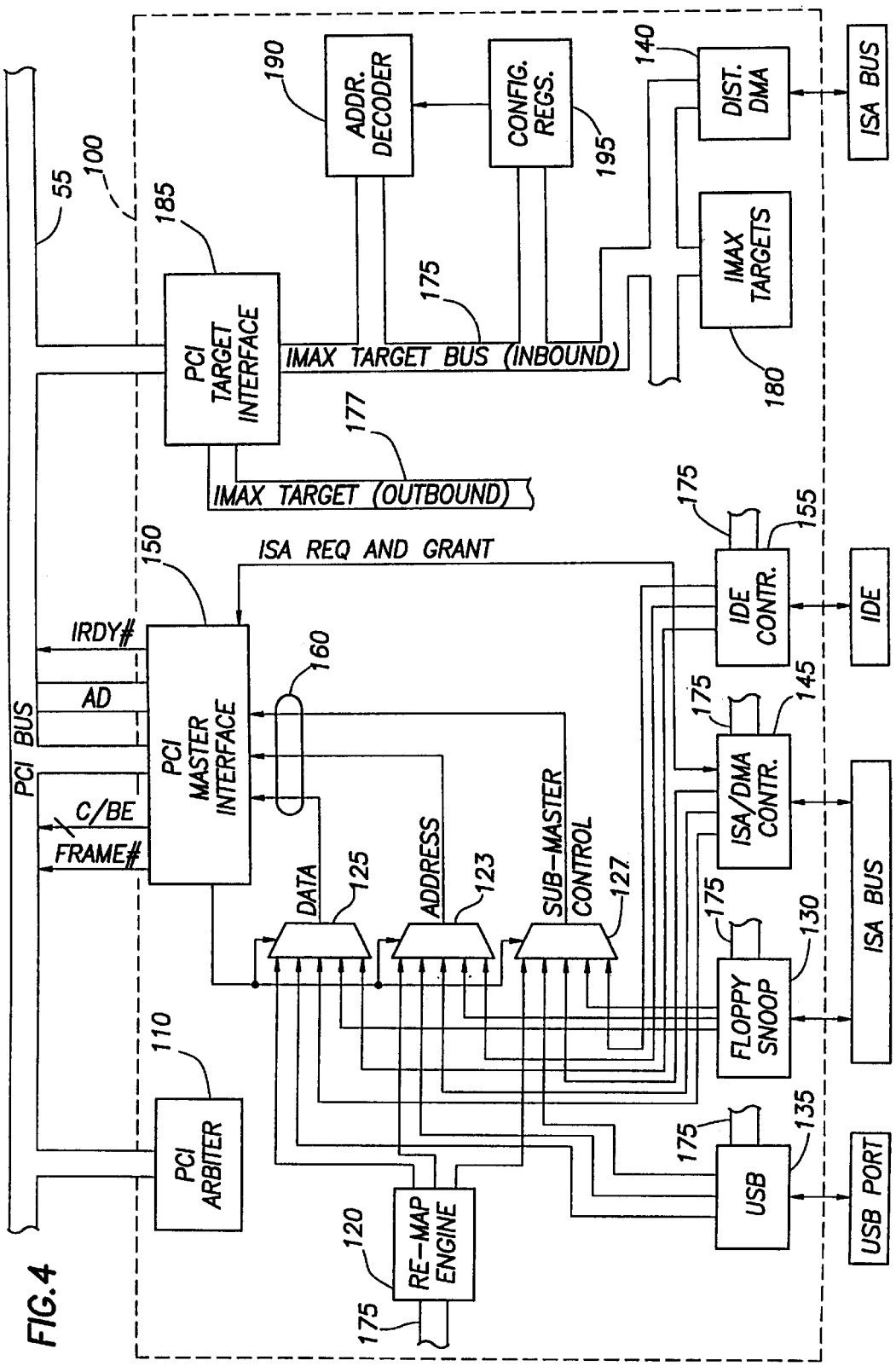
FIG. 4 is a schematic block diagram of the bridge logic device of FIG. 2 constructed in accordance with the preferred embodiment.

Referring now to FIG. 4, the South bridge logic 100 constructed in accordance with the preferred embodiment comprises the PCI master interface 150, a PCI target interface 185, a PCI arbiter 110, a plurality of various master devices, an IMAX master bus 160 coupling the master devices to the PCI master device 150, and a PCI target bus coupling a PCI target interface 185 to IMAX targets. The IMAX master devices integrated in the South bridge 100 preferably includes a floppy snoop logic 130, USB controller 135, the ISA/DMA controller 145, IDE controller 155, and re-map engine 120. Except for the re-map engine 120, each of these masters functions as an interface to an external component or bus.

The PCI Master interface 150 executes PCI cycles on behalf of ISA bus master 145, the distributed DMA re-map engine 120, floppy snoop logic 130 USB master 135 and IDE master 155. As a PCI master, the PCI master interface 150 runs memory and I/O read and write cycles on the PCI bus. The PCI master interface 150 also preferably runs memory read line commands when filling ISA/DMA or IDE or USB read line buffers. Thus, the PCI master interface 150 asserts standard PCI protocol signals on the PCI bus 55, including multiplexed address and data signals (AD), and FRAME#, C/BE, IRDY#. The PCI master interface 150 translates IMAX master cycles from the IMAX masters to PCI cycles.

In the preferred embodiment, the PCI master interface 150 includes internal IMAX arbiter logic that arbitrates mastership of the IMAX bus 160. Although any arbitration scheme may be used, the preferred embodiment implements a least recently used (LRU) arbitration scheme for awarding mastership of the IMAX master bus 160 based upon request signals from the masters. Once the internal IMAX arbiter unit arbitrates mastership of the IMAX master bus, the PCI master interface 150 issues a grant signal awarding mastership to an IMAX master and also generates control signals selecting the data from the selected master. As shown more specifically in FIG. 7, each of the IMAX masters indicate a request for mastership of the IMAX master bus 160 by asserting a imReq signal to the PCI master interface 150. The PCI master interface 150 awards mastership by returning an imGnt signal to the IMAX master awarded mastership.

Referring again to FIG. 4, the IMAX master bus 160 couples each of the internal masters to the PCI master interface 150. Preferably, the IMAX master bus includes address, data and control lines that are common to each of the masters, but are not physically shared by the masters. The master bus 160 preferably includes three multiplexers 123, 125, 127 that are used to select data, address and control signals from one of the masters once mastership is granted to the IMAX master bus 160. Thus, data signals from each of the masters connect to a separate data multiplexer 125, address signals connect to an address multiplexer 123 and control signals connect to a control multiplexer 127. The control signals from the PCI master interface arbiter connect as a select signal to each of the multiplexers 123, 125, 127 and selects data, address and control signals from one of the masters. In addition, the request (imReq) and grant (imGnt) signals noted above, and special case ISA requests and grant signals, are exchanged between the master interface 150 and ISA controller 145.

The PCI target interface 185 monitors PCI bus cycles and determines when to respond. In the preferred embodiment, the PCI target interface 185 couples to an internal address decoder 190 and configuration registers 195. The configuration registers are used, among other things, to determine if the South bridge 100 should respond to addresses to internal targets. The PCI target interface 185 couples to an IMAX target bus that transmits inbound address, data and control signals to IMAX targets 180. Each of the IMAX masters also preferably constitutes a target for the IMAX target interface 185. The PCI target interface 185 also couples to an IMAX outbound target bus that supplies data from targets during PCI read cycles. More information regarding the common target interface for South bridge 100 may be obtained from a commonly assigned and co-pending patent application entitled, "Computer System With Bridge Logic That Includes An Internal Modular Expansion Bus And A Common Target Interface For Internal Target Devices."

The address decoder 190 couples to the IMAX target bus 175 and to the configuration registers 195. The address decoder preferably conducts positive decoding of PCI cycles. In addition, in the preferred embodiment the PCI target interface 185 also operates as the subtractive decode agent for the PCI bus. Thus, the PCI target interface 185 claims a PCI cycle by asserting DEVSEL# on the PCI bus 55 when no other PCI device responds to a PCI cycle. These cycles then are passed by the target interface 185 to the ISA bus via the ISA controller 145.

The PCI arbiter 110 couples to the PCI bus 55 and receives requests from the various PCI masters on the PCI bus (including PCI master interface 150). The PCI arbiter selects one of the requesting masters and assigns the PCI cycle to that master according to known techniques. In the preferred embodiment, the PCI arbiter 110 selects a master from multiple requesting masters based upon a least recently used (LRU) arbitration scheme. Based on this protocol, after a master is granted mastership of the bus 55, the bus is re-arbitrated and the current master is put on the bottom of the priority stack.

The IDE controller 155 operates as both a master and as a target within the South bridge 100. Thus, the IDE controller 155 couples to both the IMAX master bus 160 and the IMAX target bus 175. The IDE controller 155 preferably comprises a dual mode controller that couples to IDE interface for the IDE bus. Similarly, the USB controller 135 couples to the USB port on the computer system 10. The USB controller 135 preferably operates as both a master and as a target and thus couples to both the IMAX master bus 160 and to the IMAX target bus 175. Referring still to FIG. 4, the DMA controller in the ISA/DMA controller logic 145 preferably provides 24 bits of memory address and 16 bits of byte count for each of 7 DMA channels. The ISA/DMA controller 145 presents an 8-bit interface and thus only is programmed with 8-bit I/O instructions. The ISA/DMA controller 145 supports 8 or 16-bit DMA transfers to memory on the PCI (or other expansion) bus 55. The ISA/DMA controller 145 couples to the ISA (or sub-ISA) bus and when the DMA has control of the ISA bus, the ISA/DMA controller 145 translates the DMA commands into the appropriate bus cycles. As shown in FIG. 4, the ISA/DMA controller 145 operates as both a master and as a slave, and thus couples to both the IMAX master bus 160 and the IMAX target busses 175 and 225.

The distributed DMA (DDMA) controller 140 and re-map engine 120 work in conjunction to process cycles to legacy DMA addresses. The re-map engine 120 couples to both the IMAX master bus 160 and the IMAX target bus 175. The South bridge preferably implements a distributed DMA architecture that allows multiple DMA devices to exist on the PCI bus. This architecture separates the DMA controllers into individual channels, allowing them to be distributed between PCI devices. The individuals channels, however, must appear to be at a single location. In the preferred embodiment, the DMA architecture separates the I/O address space for each channel into 16-byte blocks. This 16-byte I/O block can then be mapped anywhere in the 64 kbyte I/O address space. The old and new I/O registers are tied together by a re-map engine 120 that distributes all legacy DMA I/O accesses to the associated PCI device on a byte per byte basis. Both South bridge 100 and the South bridge in the expansion base 70 incorporate all seven DMA channels, the re-map engine 120, and the distributed DMA channel interface 140.

To enable distributed DMA service, the South bridge firmware enables the re-map engine 120 and the distributed DMA channel interface 140, and also enables and configures the addresses for the distributed DMA channels. When a PCI cycle attempts to access a legacy DMA register, the re-map engine 120 positively decodes the cycle and issues a retry signal to the PCI master that initiated the cycle. The re-map engine 120 then arbitrates for mastership of the PCI bus 55 through the IMAX bus protocol discussed below. Once the re-map engine 120 receives a mastership grant for the PCI bus, the re-map engine 120 performs cycles to the distributed DMA channels. These cycles are re-run until completed. While the re-map engine 120 is in the process of accessing the distributed channels, any access to a legacy DMA register will result in the issuance of the retry signal. The distributed channel data is collected and stored in preparation for the cycle to be executed when retried by the PCI master.

When an access is made to a native DMA register, the address is positively decoded. The address then is translated to a legacy DMA address by the Distributed DMA controller and then the access is transferred to the local ISA bus. Data returned in response to the access is translated from legacy DMA to distributed DMA protocol before being transferred to the PCI bus 55.

Referring now to FIGS. 2 and 4, the floppy snoop logic 130 operates as both a South bridge master and target. Thus, floppy snoop 130 couples to the IMAX master bus 160 and to the IMAX target bus 175. In addition, the floppy snoop logic 130 also couples to the ISA bus as shown in FIG. 4. When a PCI write cycle is made to a floppy address that is shadowed in the expansion base 70, the snoop logic 130 will cause a retry signal to be issued to the PCI master that initiated the cycle to start a delayed transaction. The floppy snoop then initiates the floppy write cycle on the PCI bus through the PCI master interface 150 to shadowed floppy registers in the expansion base 70. At the same time, the floppy snoop logic 130 also runs a write cycle to the MSIO 92 on the sub-ISA bus 87. When the external PCI master retries the write cycle, the snoop logic completes the delayed transaction.

According to the preferred embodiment, the master IMAX bus 160 comprises a high speed, 32-bit, internal ASIC bus. The master IMAX bus functions as the primary means of communication between internal master devices 135, 145, 155 (for example) and the internal expansion bus master 150. By standardizing on a particular internal bus protocol for the South bridge, much of the South bridge ASIC may be reused in future design efforts. In addition, the manufacturers of peripheral devices can design devices compatible with the IMAX protocol to insure that their designs will remain compatible with future generations for the South bridge logic. Furthermore, the design of an internal master (such as the IDE IMAX master 155 or USB master 135) is not tied to a specific expansion bus like PCI. Since a common bus master interface is used to couple other devices to the expansion bus, only the bus master interface 150 needs to be modified if the expansion bus protocol is changed or modified. The master IMAX bus 160 preferably is not tri-stated and is always driven. Therefore only one internal master talks to the expansion bus master interface 150 at any given time. The multiplexing of the different internal masters is done using arbitration logic in the expansion bus master interface, as discussed in more detail above.

In addition to the IMAX master bus 160, the South bridge 100 also includes an IMAX target bus 175. The IMAX target bus 175 includes both an inbound address, data and control bus, and an outbound data bus. The inbound data bus in the IMAX target bus 175 also is used by IMAX master devices to obtain read data from external targets. Thus, the inbound data line in the IMAX target bus 175 preferably performs "double-duty" by transmitting (1) data from expansion bus masters to internal targets as part of a write cycle, and (2) data from an expansion bus target to internal IMAX masters as part of a read cycle.

Figure 7:
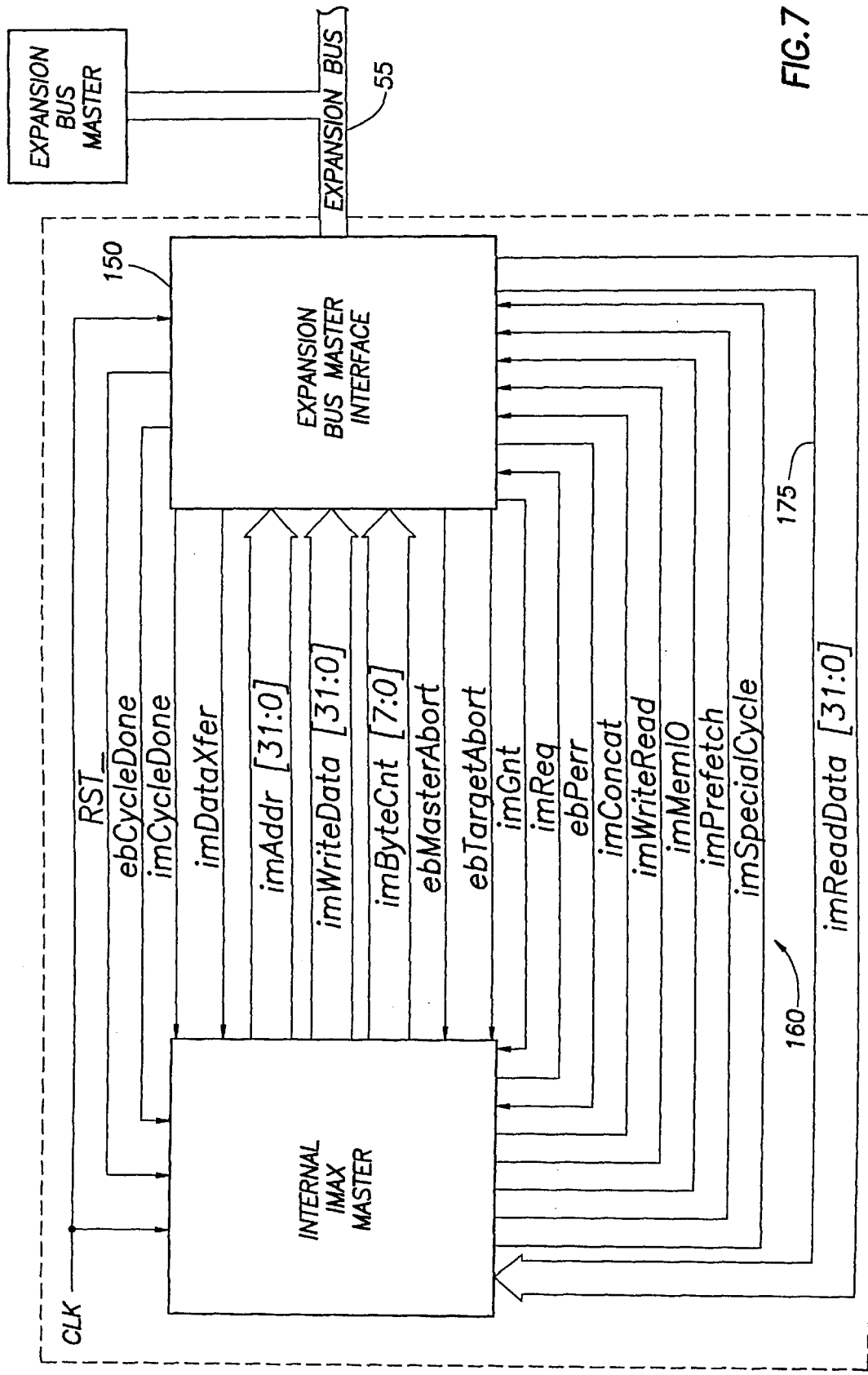
FIG. 7 is a block diagram illustrating the signal lines comprising the IMAX master bus of FIG. 4.

Now that the PCI master interface and the masters have been discussed, the various signals used in the preferred embodiment will be described in tabular form. One skilled in the art will understand that these signals may be modified or adapted as necessary without departing from the principles of the present invention. Referring now to FIG. 7, each of these signals is described from the perspective of the IMAX masters.

TABLE I

System Signals

| SIGNAL | I/O | DESCRIPTIONS |
|---|---|---|
| CLK | I | The clock signal provides the timing for all the transactions on the IMAX bus. Every signal in the IMAX interface is synchronous (except for RST#) and must be sampled on the rising edge of CLK. |
| RST# | I | The reset is used in both interfaces to reset IMAX specific registers and signals. |

The clock (CLK) signal functions as the synchronizing signal on the IMAX master bus 160. The same CLK signal also preferably is used to synchronize operations on the IMAX target bus.

The expansion bus master interface 150 preferably awards mastership of the IMAX master bus 160 based upon the signals identified in Table II.

TABLE II

Arbitration Signals

| SIGNAL | I/O | DESCRIPTIONS |
|---|---|---|
| ImReq | O | IMAX master request. The assertion of this signal indicates that the IMAX master wants to run a transaction to the expansion bus. This must be de-asserted on the clock following the imGnt assertion if the IMAX master does not intend to immediately run more transactions after the current one. |
| ImGnt | I | IMAX master grant. The assertion of this signal by the expansion bus master indicates that the IMAX master's address and transaction information has been captured and the IMAX data phase has been entered. |
| ImConcat | O | IMAX master concatenation. This signal is asserted with request to indicate that this IMAX master's transaction could be concatenated with this IMAX master's previous transaction. |

Referring still to FIG. 7, the IMAX master devices request mastership of the IMAX master bus 160 by asserting a request (imReq) signal to the expansion bus master interface 150. The master interface awards mastership by asserting a grant (imGnt) signal to a particular requesting master. In certain situations, a master that has been awarded the IMAX master bus 160 may request that it be permitted to concatenate cycles by asserting imConcat with the imReq signal.

The address and data signals exchanged between the internal master and the Expansion Bus master interface in the preferred embodiment are detailed in Table III.

TABLE III

Address and Data Signals

| SIGNAL | I/O | DESCRIPTIONS |
|---|---|---|
| ImAddr[31:0] | O | This provides the address of the device on the expansion bus which will receive the transactions. |
| ImWriteData[31:0] | O | This bus provides the data to be written to the expansion bus by the IMAX master. |
| ImReadData[31:0] | I | This provides the data to the IMAX master which was read by the expansion bus master. |
| ImByteCnt[7:0] | O | IMAX master byte count. This signal indicates the number of bytes that the IMAX master wants to transfer on the expansion bus. |

The internal master transmits a 32 bit address signal (imAddr) identifying the intended target for the cycle. The master also transmits a 32 bit data signal (imWriteData) for write transactions. The number of bytes to be transferred on the expansion bus is identified by a byte count (imByteCnt) signal. For read transactions, a 32 bit data signal (imReadData) is transmitted on the inbound data line of the IMAX target bus to the internal master requesting the data.

The control signals exchanged between the master device and the Expansion Bus master interface according to the preferred embodiment are detailed in Table IV.

TABLE IV

Interface Control Signals

| SIGNAL | I/O | DESCRIPTIONS |
|---|---|---|
| imDataXfer | I | IMAX master data transfer signal. This signal indicates the data is being transferred this clock to or from the expansion bus master. On IMAX master writes, the assertion of this signal indicates that the expansion bus master has captured the data. On IMAX master reads, the assertion of this signal indicates that the data available on imReadData is valid during this clock. |
| *imCycleDone | I | IMAX master cycle done. The assertion of this signal along with the imDataXfer signal indicates that the current data transfer is the last transfer for this IMAX master's transaction. |
| ebCycleDone | I | Expansion Bus cycle done. The assertion of this signal indicates that the IMAX master's transaction has completed on the expansion bus and all potential error conditions have been checked. Any IMAX error signals are also asserted at the same time as this signal. For concatenated cycles, an ebCycleDone will still be returned for each IMAX cycle even though only one cycle occurred on the expansion bus. |
| imWriteRead | O | When high indicates a write transaction requested. When low, a read transaction is requested. |
| imMemIO | O | When high indicates a memory transaction is requested. When low, an IO transaction is requested. |

Referring still to FIG. 7, the control signals identify when data is available on the IMAX master bus or when cycles have been completed on the IMAX master bus. In addition, the imWriteRead signal indicates if the master cycle is a write cycle or a read cycle. The imMemIO cycle identifies if the master cycle targets main memory or an I/O address.

Tables IV and V identify other error signals and PCI specific signals that are implemented in the preferred embodiment.

TABLE V

Error Signals

| SIGNAL | I/O | DESCRIPTIONS |
|---|---|---|
| *ebMasterAbort | I | Expansion Bus Master abort signal. The assertion of this signal along with the ebCycleDone signal indicates that a target did not respond to the cycle on the expansion bus. |
| *ebTargetAbort | I | Expansion Bus Target abort signal. The assertion of this signal along with the ebCycleDone signal indicates that the target on the expansion bus aborted the cycle. |
| *ebPerr | I | Expansion Bus Parity error signal. The assertion of this signal along with the ebCycleDone signal indicates that a parity error occurred during the expansion bus transaction. |

TABLE VI

Optional Bus-specific signals

| SIGNAL | I/O | DESCRIPTIONS |
|---|---|---|
| imPrefetch | O | IMAX master Pre-fetchable. When asserted, indicates that the address is a pre-fetchable region. This allows for performance improvements on the PCI bus such as memory read line or memory read multiple commands. This signal is optional. |
| ImSpecialCycle | O | IMAX master Special Cycle. This signal is optional. |

The * indicates that the validity of this signal is dependent on the assertion of another signal.

Referring still to FIG. 7, a master IMAX transaction preferably has three phases; (1) the cycle start phase, (2) the data phase, and (3) the cycle completion phase. The cycle start phase begins with the assertion of the IMAX master's request signal (imReq) with the transaction information (address, number of bytes to be transferred, type of transaction, and data for write cycles). The data phase is entered when the expansion bus master interface asserts the IMAX master's grant signal (imGnt) signaling that the expansion bus master will now begin providing or retrieving data from the IMAX master. The assertion of the grant signal also signifies that the IMAX master may remove the cycle information from the IMAX bus.

Upon entering the data phase, the expansion bus master interface transfers data to or from the IMAX master by asserting the imDataXfer signal. This bus phase can overlap with the cycle start phase in which case the imDataXfer signal is asserted along with the grant signal (imGnt) to transfer the first piece of data. The data phase is only completed by the transfer of all the data requested by the IMAX master. If an error occurs during the expansion bus transaction, the expansion bus master will continue to transfer the IMAX master's data even though it may not ever make it onto the expansion bus (for writes) or is invalid (for reads). On the assertion of the imDataXfer signal for the last piece of data, the imCycleDone signal is asserted by the expansion bus master to indicate that all the IMAX master's data has been transferred. Once this has occurred, the cycle completion phase is entered.

The cycle completion phase signals the IMAX master that the transaction has completed on the expansion bus and also indicates if any errors occurred. This is useful for those devices that need to know that the transaction has indeed been run on the expansion bus for status bits. An IMAX master is not required to wait for the cycle completion phase before entering the cycle start phase again. To keep the pipeline full, it is desirable to have the IMAX master begin requesting the bus as soon as it knows it can provide data or storage for another transaction.

Figure 5:
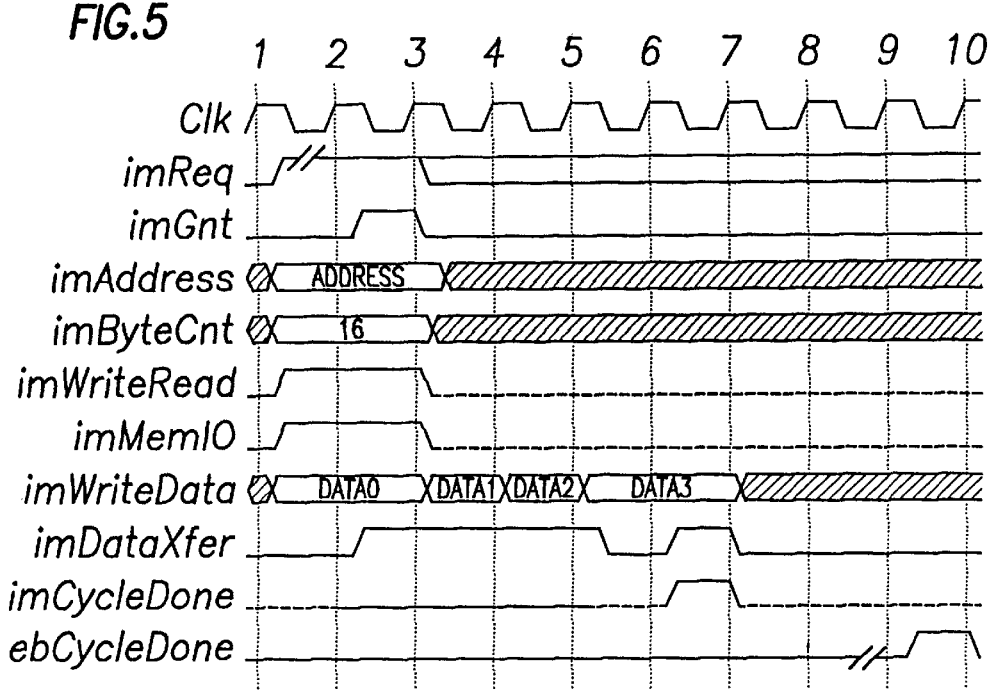
FIG. 5 is a timing diagram illustrating a write transaction on the IMAX master bus depicted in FIG. 4.

Referring now to FIG. 5, a timing diagram is shown for purposes of illustrating a write cycle on the IMAX master bus 160. As shown in FIG. 5, the imReq signal is asserted indicating that an IMAX master (such as the USB controller 135, for example) requests control of the IMAX bus 160. At the same time, the master indicates whether the cycle is a read or write by the status of the imWriteRead signal, which in FIG. 5 is asserted high to indicate a write cycle. The master also supplies the address signal (imAddress) on the address lines of the IMAX bus and the number of bytes to be written as indicated by the imByteCnt signal. The master also supplies the first 32 bits of data (Data0) as the imWriteData signal. Finally, the master also indicates a cycle is requested to memory based upon the assertion of the imMemIO signal. In the data phase, the expansion bus master 150 grants mastership of the IMAX master bus 160 by asserting the imGnt signal to the master. The expansion bus master interface 150 indicates that it is capturing the data to be written by asserting the imDataXfer signal. The last byte of data is received and the master interface 150 acknowledges completion of the cycle by asserting the imCycleDone signal. The completion of the write cycle on the expansion bus (the PCI bus in FIG. 4) is acknowledged by the assertion of the ebCycleDone signal by the master interface 150.

Figure 6:
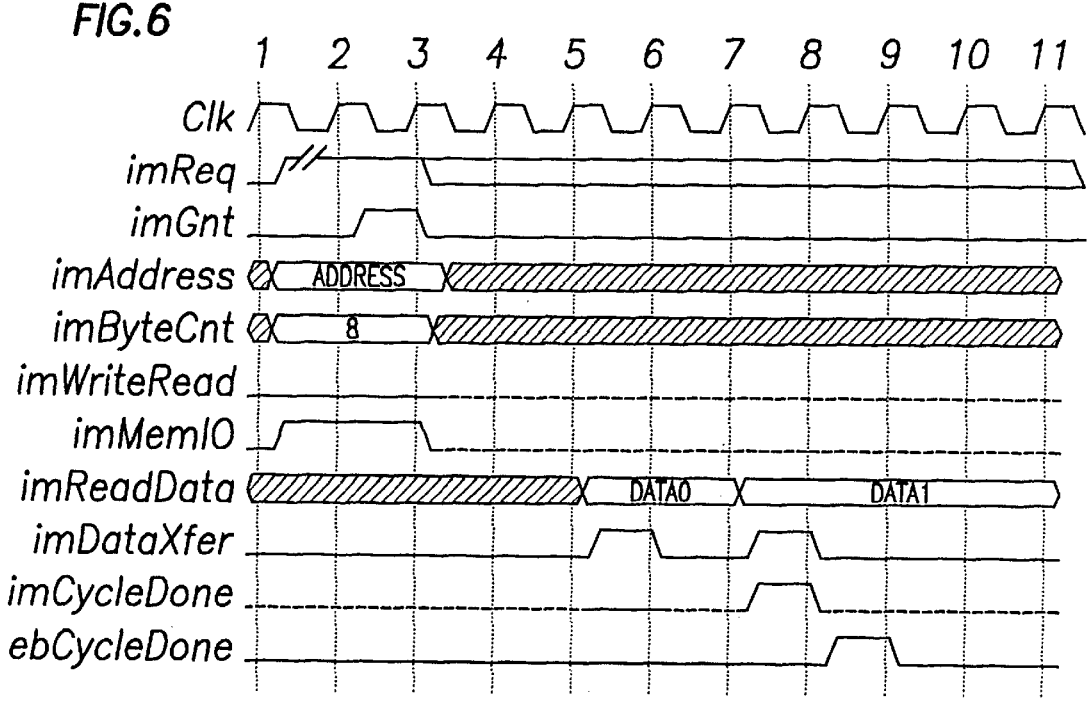
FIG. 6 is a timing diagram illustrating a read transaction on the IMAX master bus depicted in FIG. 4.

Referring now to FIG. 6, a read cycle will now be described. As shown in FIG. 6, the imReq signal is asserted indicating that an IMAX master (such as the USB controller 135, for example) requests control of the IMAX bus 160. At the same time, the master indicates whether the cycle is a read or write by the status of the imWriteRead signal, which in FIG. 6 is low to indicate a read cycle. The master also supplies the address signal (imAddress) on the address lines of the IMAX bus and the number of bytes to be written as indicated by the imByteCnt signal. The master also indicates a cycle is requested to memory based upon the assertion of the imMemIO signal. The expansion bus master 150 grants mastership of the IMAX master bus 150 by asserting the imGnt signal to the master. The expansion bus master interface 150 indicates that valid read data is available on the imReadData signal by asserting the imDataXfer signal. The last byte of data is received and the master interface 150 acknowledges completion of the cycle by asserting the imCycleDone signal. The completion of the read cycle on the expansion bus (the PCI bus in FIG. 4) is acknowledged by the assertion of the ebCycleDone signal by the master interface 150.

The above discussion is meant to be illustrative of the principles of the present invention. However, numerous variations and modifications will become apparent to those skilled in the art once the above disclosure is fully appreciated. It is intended that the following claims be interpreted to embrace all such variations and modifications.

We claim:

1. A computer system, comprising:
   a CPU;
   a main memory;
   at least one peripheral device coupled to said CPU and said memory by an expansion bus;
   a bridge logic device connected to said expansion bus, said bridge logic being capable of running master cycles on said expansion bus;
   wherein said bridge logic includes:
      a plurality of master devices;
      a common expansion bus master interface coupled to said expansion bus and to said plurality of master devices for executing expansion bus master cycles on behalf of said master devices; and
   wherein at least one of said plurality of master devices couple to a second expansion bus.

2. A computer system as in claim 1, wherein said expansion bus comprises a PCI bus, and said second expansion bus comprises an ISA bus.

3. A computer system as in claim 2, wherein at least one of said master devices comprises an ISA controller residing in the bridge logic device.

4. A computer system as in claim 1, wherein said second expansion bus comprises an IDE bus, and at least one of said master devices comprises an IDE controller integrated in the bridge logic device.

5. A computer system as in claim 1, wherein said second expansion bus comprises a USB bus, and at least one of said master devices comprises a USB controller integrated in the bridge logic device.

6. A computer system as in claim 1, wherein said plurality of master devices includes a re-map engine for completing cycles on said expansion bus addressed to legacy DMA channels.

7. A computer system, comprising:
   a CPU;
   a main memory;
   at least one peripheral device coupled to said CPU and said memory by an expansion bus;
   a bridge logic device connected to said expansion bus, said bridge logic being capable of running master cycles on said expansion bus;
   wherein said bridge logic includes:
      a plurality of master devices;
      a common expansion bus master interface coupled to said expansion bus and to said plurality of master devices for executing expansion bus master cycles on behalf of said master devices; and wherein said bridge logic includes an internal modular master expansion bus coupling said plurality of master devices to said common expansion bus master interface.

8. A computer system as in claim 7, wherein said expansion bus comprises a PCI bus and said expansion bus master interface comprises a PCI master interface for translating internal modular master expansion bus cycles to master PCI cycles.

9. A computer system as in claim 8, wherein said bridge logic device comprises a South bridge coupling the PCI bus to one or more secondary expansion busses.

10. A computer system as in claim 9, further comprising a North bridge logic coupling said CPU and said main memory to the PCI bus.

11. A computer system as in claim 7, wherein said bridge logic further includes:
an expansion bus target interface coupled to said expansion bus; and
an internal modular target expansion bus coupling said plurality of master devices to said expansion bus target interface.

12. A computer system, comprising:
a CPU;
a main memory;
a bridge logic device coupled to said CPU and said main memory by an expansion bus, said bridge logic coupling external peripheral devices to said expansion bus for running master cycles on said expansion bus to said main memory;
wherein said bridge logic includes:
a plurality of master devices;
a common internal modular master bus coupling said plurality of master devices to said expansion bus; and
an expansion bus master interface coupled to said expansion bus and to said common internal modular bus, said expansion bus master interface executing expansion bus master cycles on behalf of said master devices.

13. A computer system as in claim 12, wherein said expansion bus comprises a PCI bus, and said expansion bus master interface comprises a PCI bus master interface executing PCI master cycles on behalf of said master devices.

14. A computer system as in claim 13, wherein said bridge logic device comprises a South bridge coupling the PCI bus to one or more secondary expansion busses.

15. A computer system as in claim 14, wherein said secondary expansion bus comprises an ISA bus, and one of said plurality of master devices comprises an ISA controller.

16. A computer system as in claim 14, wherein said secondary expansion bus comprises a USB bus, and one of said plurality of master devices comprises a USB controller.

17. A computer system as in claim 14, wherein said secondary expansion bus comprises an IDE bus, and one of said plurality of master devices comprises an IDE controller.

18. A computer system as in claim 12 wherein said b ridge logic further includes:
an expansion bus target interface coupled to said expansion bus; and
an internal modular target expansion bus coupling said plurality of master devices to said expansion bus target interface.

19. A computer system, comprising:
a CPU;
a main memory;
a North bridge logic device coupling a primary expansion bus to said CPU and said main memory;
a South bridge logic device connected to said expansion bus, said South bridge logic coupling at least one secondary expansion bus to said primary expansion bus for running master cycles originating from devices on said at least one secondary expansion bus on said primary expansion bus;
wherein said South bridge logic includes:
a control device for said at least one secondary expansion bus;
a common expansion bus master interface coupled to said primary expansion bus and to a corresponding control device for said at least one secondary expansion bus, said common expansion bus master interface executing expansion bus master cycles on behalf of said master devices; and
an internal modular master expansion bus coupled to said control device and to said common expansion bus master interface for transferring master cycles initiated by the control device to the expansion bus master interface.

20. A computer system as in claim 19, wherein said primary expansion bus comprises a PCI bus, and said expansion bus master interface comprises a PCI master interface that translates master cycles on said internal modular master expansion bus to PCI master cycles.

21. A computer system as in claim 19, wherein said at least one secondary expansion bus comprises one or more of the following busses: an ISA bus; a USB bus; or an IDE bus.

22. A computer system as in claim 19, wherein said control device includes one or more of the following: a re-map engine; a floppy snoop logic; a USB controller; an ISA controller; or an IDE controller.

23. A computer system as in claim 19, wherein said control device includes a re-map engine for completing cycles on said secondary expansion bus addressed to legacy DMA channels.

24. A computer system, comprising:
a CPU;
a main memory;
a bridge logic device coupled to said CPU and said main memory by an expansion bus, said bridge logic coupling external peripheral devices to said expansion bus for running master cycles on said expansion bus to said main memory;
wherein said bridge logic includes:
a plurality of master devices;
a common internal modular master bus coupling said plurality of master devices to said expansion bus;
a plurality of target devices; and
a common internal modular target bus coupling said plurality of target devices to said expansion bus.

25. A computer system as in claim 24, wherein said expansion bus comprises a PCI bus, and said expansion bus master interface comprises a PCI master interface that translates master cycles on said internal modular master bus to PCI master cycles.

26. A computer system as in claim 24, wherein said expansion bus comprises a PCI bus, and said expansion bus target interface comprises a PCI target interface that translates cycles on said PCI bus to internal modular target bus cycles.

27. A computer system as in claim 24, wherein said plurality of master devices also comprise at least some of said plurality of target devices.

28. A computer system as in claim 27, wherein said master devices include one or more of the following: a re-map engine; a floppy snoop logic; a USB controller; an ISA controller; or an IDE controller.

29. A method of running master cycles to a primary expansion bus from a master device within a bridge logic to a master interface within the bridge logic through an internal modular master expansion bus, comprising:

asserting a request for mastership from the master device to the master interface;

supplying transaction information to the master interface on the internal modular master expansion bus;

asserting a mastership grant signal from the master interface to the master device;

receiving the transaction information from the internal modular master expansion bus;

translating the transaction information to a protocol understood by the primary expansion bus;

transmitting the translated information to the primary expansion bus; and transmitting a signal from the master interface to the master device indicating that the signals have been transferred to the primary expansion bus.

30. A method as in claim 29, wherein said primary expansion bus comprises a PCI bus, and the translating step includes converting the transaction information to PCI signals.

31. A bridge logic device, comprising:

a plurality of master devices;

a common bus master interface capable of coupling to an external expansion bus and coupling to said plurality of master devices for executing bus master cycles on said external expansion bus on behalf of said master devices; and an internal modular expansion bus coupling said plurality of master devices to said common bus master interface.

32. A bridge logic as in claim 31, wherein at least one of said plurality of master devices is capable of coupling to a secondary expansion bus.

33. A bridge logic as in claim 34, wherein said external expansion bus comprises a PCI bus, and said bus master interface translates internal modular expansion bus cycles to PCI cycles.

34. A bridge logic as in claim 33, wherein said bridge logic comprises a South bridge coupling the PCI bus to the secondary expansion bus.

35. A bridge logic as in claim 32, further comprising a target interface coupled to said external expansion bus.

36. A bridge logic as in claim 35, further comprising:

an internal modular target expansion bus coupling said plurality of master devices to said target interface.

* * * * *

UNITED STATES PATENT AND TRADEMARK OFFICE
CERTIFICATE OF CORRECTION

PATENT NO. : 6,226,700 B1
DATED : May 1, 2001
INVENTOR(S) : Shaun Wandler et al.

It is certified that error appears in the above-identified patent and that said Letters Patent is hereby corrected as shown below:

Column 20,
Line 11, change "34" to read -- 32 --.

Signed and Sealed this

Fifteenth Day of October, 2002

Attest:

Attesting Officer

JAMES E. ROGAN
Director of the United States Patent and Trademark Office